(12) United States Patent
Hayashi et al.

(10) Patent No.: US 11,990,582 B2
(45) Date of Patent: May 21, 2024

(54) SOLID-ELECTROLYTE MATERIAL AND BATTERY INCLUDING THE SAME

(71) Applicant: Panasonic Intellectual Property Management Co., Ltd., Osaka (JP)

(72) Inventors: Yohei Hayashi, Osaka (JP); Tetsuya Asano, Nara (JP); Masashi Sakaida, Hyogo (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 461 days.

(21) Appl. No.: 17/342,998

(22) Filed: Jun. 9, 2021

(65) Prior Publication Data
US 2021/0305625 A1    Sep. 30, 2021

Related U.S. Application Data (63) Continuation of application No. PCT/JP2019/046738, filed on Nov. 29, 2019.

(30) Foreign Application Priority Data

Dec. 28, 2018  (JP) ................. 2018-248583
Oct. 17, 2019  (JP) ................. 2019-190378

(51) Int. Cl.
| | | |
|---|---|---|
| *H01M 10/0562* | (2010.01) | |
| *H01M 4/02* | (2006.01) | |
| *H01M 4/133* | (2010.01) | |
| *H01M 10/0525* | (2010.01) | |

(52) U.S. Cl.
CPC ....... *H01M 10/0562* (2013.01); *H01M 4/133* (2013.01); *H01M 10/0525* (2013.01); *H01M 2004/027* (2013.01); *H01M 2300/008* (2013.01)

(58) Field of Classification Search
CPC ......... H01M 10/0562; H01M 10/0525; H01M 4/133; H01M 4/587; H01M 4/62; H01M 2004/027; H01M 2004/028; H01M 2300/008; H01M 2300/0065; H01M 2300/0068; H01M 2300/0071; C01P 2002/72; C01P 2002/77; C01F 11/00
See application file for complete search history.

(56) References Cited

U.S. PATENT DOCUMENTS

| | | |
|---|---|---|
| 6,187,479 B1 | 2/2001 | Liu |
| 2012/0301796 A1 | 11/2012 | Ohtomo et al. |
| 2018/0277890 A1 | 9/2018 | Ueda et al. |
| 2019/0181443 A1 | 6/2019 | Ikeuchi et al. |

FOREIGN PATENT DOCUMENTS

| | | |
|---|---|---|
| JP | 2011-129312 | 6/2011 |
| JP | 2018-055865 | 4/2018 |
| WO | 2018/092359 | 5/2018 |

OTHER PUBLICATIONS

International Search Report of PCT application No. PCT/JP2019/046738 dated Dec. 24, 2019.

(Continued)

*Primary Examiner* — Matthew W Van Oudenaren
(74) *Attorney, Agent, or Firm* — Rimon P.C.

(57) ABSTRACT

A solid-electrolyte material includes a crystal phase constituted by Li, M, X, and O. M is at least one element selected from the group consisting of Mg, Ca, and Sr. X is at least two elements selected from the group consisting of F, Cl, Br, and I.

14 Claims, 5 Drawing Sheets

(56) References Cited

OTHER PUBLICATIONS

EPC Office Action dated Mar. 9, 2023 for the related European Patent Application No. 19904330.8.
Carl R Schlaikjer et al, "Ionic Conduction in Calcium Doped Polycrystalline Lithium Iodide," Journal of the Electrochemical Society,, vol. 118, No. 9, Sep. 1, 1971 (Sep. 1, 1971), pp. 1447-1450, XP001275560.
The Extended European Search Report dated Jan. 25, 2022 for the related European Patent Application No. 19904330.8.
Ravi B G et al: "Preparation and a.c. conductivity studies of CaF"2-LiF composites, Materials Science and Engineering: B, Elsevier, Amsterdam, NL, vol. 41, No. 2, Nov. 1, 1996 (Nov. 1, 1996), pp. 241-246, XP004049581 , ISSN: 0921-5107, DOI: 10.1016/S0921-5107(96)01607-8.
Indian Office Action dated Jan. 11, 2023 for the related Indian Patent Application No. 202147027939.

SOLID-ELECTROLYTE MATERIAL AND BATTERY INCLUDING THE SAME

BACKGROUND

1. Technical Field

The present disclosure relates to a solid-electrolyte material and a battery that includes the solid-electrolyte material.

2. Description of the Related Art

Japanese Unexamined Patent Application Publication No. 2011-129312 discloses a solid-state battery that includes a sulfide solid electrolyte material.

SUMMARY

One non-limiting and exemplary embodiment provides a solid-electrolyte material having a high ionic conductivity.

In one general aspect, the techniques disclosed here feature a solid-electrolyte material including a crystal phase constituted by Li, M, X, and O. M is at least one element selected from the group consisting of Mg, Ca, and Sr. X is at least two elements selected from the group consisting of F, Cl, Br, and I.

The present disclosure may provide a solid-electrolyte material having a high ionic conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

An embodiment of the present disclosure is described with reference to the attached drawings below.

First Embodiment

A solid-electrolyte material according to a first embodiment includes a crystal phase constituted by Li, M, X, and O. M is at least one element selected from the group consisting of Mg, Ca, and Sr. X is at least two elements selected from the group consisting of F, Cl, Br, and I. The solid-electrolyte material according to the first embodiment may have a high ionic conductivity.

Since the solid-electrolyte material according to the first embodiment does not contain sulfur, it does not produce hydrogen sulfide when exposed to air. Thus, the solid-electrolyte material according to the first embodiment is excellent in terms of safety. Note that the sulfide solid electrolyte material disclosed in Japanese Unexamined Patent Application Publication No. 2011-129312 may produce hydrogen sulfide when exposed to air.

Since the solid-electrolyte material according to the first embodiment does not contain any rare-earth elements, it may be produced at low costs.

M may include Ca in order to increase the ionic conductivity of the solid-electrolyte material. M may be Ca in order to increase the ionic conductivity of the solid-electrolyte material.

X may be Br and I in order to increase the ionic conductivity of the solid-electrolyte material.

The crystal phase may further include MA in order to increase the ionic conductivity of the solid-electrolyte material. MA is at least one element selected from the group consisting of Na, K, Rb, and Cs.

The crystal phase may have a peak at a diffraction angle $2\theta$ of greater than or equal to 25° and less than or equal to 29°, a diffraction angle $2\theta$ of greater than or equal to 29° and less than or equal to 33°, and a diffraction angle $2\theta$ of greater than or equal to 41° and less than or equal to 47° in an X-ray diffraction pattern obtained by an X-ray diffraction measurement using Cu-Kα radiation.

In a first conversion pattern obtained by transforming the horizontal axis of the X-ray diffraction pattern of the solid-electrolyte material from diffraction angle $2\theta$ to q on the basis of Expression $q=4\pi \sin \theta/\lambda$ (where $\lambda$ represents the wavelength of an X-ray used in the X-ray diffraction measurement), the value of q at which a peak is present at q of greater than or equal to 1.76 Å$^{-1}$ and less than or equal to 2.05 Å$^{-1}$ may be defined as $q_0$ and, in a second conversion pattern obtained by transforming the horizontal axis of the X-ray diffraction pattern from diffraction angle $2\theta$ to $q/q_0$, a peak may be present at $q/q_0$ of greater than or equal to 1.13 and less than or equal to 1.18 and $q/q_0$ of greater than or equal to 1.60 and less than or equal to 1.66. A crystal phase having such peaks may have a high ionic conductivity. The above-described conversion enables the extraction of the ratio between the interlayer spacings of different diffraction planes from X-ray diffraction patterns. This eliminates the change in peak position caused due to the difference in lattice constant and makes the feature of an identical crystal structure more distinctive.

The crystal structure of the crystal phase is not limited. Examples of the crystal structure include a rock-salt structure having a crystal structure belonging to the space group Fm-3m and a spinel or inverse-spinel structure having a crystal structure belonging to the space group Fd-3m. The sublattice constituted by anions may have a cubic closest packed structure or a distorted cubic closest packed structure. The elements in the crystals may occupy equivalent sites randomly or may be arranged regularly. The term "equivalent sites" used herein refers to positions that overlap each other by a symmetry operation defined by the space group.

The solid-electrolyte material according to the first embodiment may include a crystal phase having a crystal structure different from that of the above crystal phase.

The molar ratio of Li to M may be greater than or equal to 0.667 and less than or equal to 11.3 in order to increase the ionic conductivity of the solid-electrolyte material. When the above molar ratio is greater than or equal to 0.667, a sufficiently large amount of lithium ions are present in the crystals. This facilitates the conduction of lithium ions. When the above molar ratio is less than or equal to 11.3, the likelihood of the lithium ions in the crystals interfering with one another is reduced. This enables the pathways through which the lithium ions are conducted to be formed in a sufficient amount.

The molar ratio of X to M may be greater than or equal to 2.66 and less than or equal to 13.34 in order to increase the ionic conductivity of the solid-electrolyte material. The higher the content of anions in the crystals, the higher the content of lithium ions in the crystals; the lower the content of anions in the crystals, the lower the content of lithium ions in the crystals. When the above molar ratio is greater than or equal to 2.66, a sufficiently large amount of lithium ions are present in the crystals. When the above molar ratio is less than or equal to 13.34, the pathways through which the lithium ions are conducted can be formed in the crystals in a sufficient amount.

The molar ratio of MA to M may be greater than or equal to 0 and less than or equal to 1.33 in order to increase the ionic conductivity of the solid-electrolyte material. When the above molar ratio is less than or equal to 1.33, it becomes easy to dissolve M in the crystals. In other words, the risk of collapse of the crystal structure is reduced. For example, the above molar ratio may be greater than or equal to 0.110 and less than or equal to 1.33.

The molar ratio of O to M may be greater than 0 and less than or equal to 0.2 in order to increase the ionic conductivity of the solid-electrolyte material. When the above molar ratio is less than or equal to 0.2, the risk of divalent anions blocking the conduction of lithium ions can be reduced.

The molar ratio of Br to X may be greater than or equal to 0.375 and less than or equal to 0.625 in order to increase the ionic conductivity of the solid-electrolyte material. This enables the crystal structure having a high ionic conductivity to be maintained.

The molar ratio of I to X may be greater than or equal to 0.375 and less than or equal to 0.625 in order to increase the ionic conductivity of the solid-electrolyte material. This enables the crystal structure having a high ionic conductivity to be maintained.

The shape of the solid-electrolyte material according to the first embodiment is not limited. Examples of the above shape include acicular, spherical, and oval. The solid-electrolyte material according to the first embodiment may be particulate. The solid-electrolyte material according to the first embodiment may be formed in a pellet-like or plate-like shape.

In the case where the solid-electrolyte material according to the first embodiment is particulate (e.g., spherical), the solid-electrolyte material may have a median diameter of greater than or equal to 0.1 µm and less than or equal to 100 µm and may desirably have a median diameter of greater than or equal to 0.5 µm and less than or equal to 10 µm. In such a case, the solid-electrolyte material according to the first embodiment may have a further high ionic conductivity. Furthermore, the solid-electrolyte material according to the first embodiment and materials other than the solid-electrolyte material can be dispersed in a suitable manner. The term "median diameter" used herein refers to the particle size at which the cumulative volume in a volume-basis particle size distribution is equal to 50%. The volume-basis particle size distribution can be measured with a laser diffraction analyzer or an image processor.

In order to disperse the solid-electrolyte material according to the first embodiment and an active material in a suitable manner, the solid-electrolyte material according to the first embodiment may have a smaller median diameter than the active material.

Method for Producing Solid Electrolyte

The solid-electrolyte material according to the first embodiment is produced by, for example, the following method.

Powders of halide raw materials are mixed with one another such that the resulting mixture has an intended composition.

For example, in the case where the intended composition is $Li_2CaBr_2I_2$, a LiBr raw material powder and a $CaI_2$ raw material powder are mixed with each other at a molar ratio of 2:1. The combination of cation and anion may be changed in order to produce the same composition. For example, a LiI raw material powder and a $CaBr_2$ raw material powder may be mixed with each other at a molar ratio of 2:1. The raw material powders may be mixed with each other at a specific molar ratio that has been determined such that the composition change that may occur in the synthesis process can be canceled out.

The raw material powders are caused to react with each other mechanochemically (i.e., using mechanochemical milling) in a mixer, such as a planetary ball mill, to form a mixture. The product of the reaction may be baked in an atmosphere containing oxygen. Alternatively, the reaction product may be produced by baking the mixture of the raw material powders in an atmosphere containing oxygen. The concentration of the oxygen may be, for example, about 30 ppm. The baking treatment may be performed at a temperature of greater than or equal to 100° C. and less than or equal to 700° C. or at a temperature of greater than or equal to 400° C. and less than or equal to 600° C.

The solid-electrolyte material according to the first embodiment is produced by the above-described method.

Second Embodiment

A second embodiment of the present disclosure is described below. The items described in the first embodiment are omitted as needed.

A battery according to the second embodiment includes a positive electrode, an electrolyte layer, and a negative electrode. The electrolyte layer is interposed between the positive and negative electrodes.

At least one selected from the group consisting of the positive electrode, the electrolyte layer, and the negative electrode includes the solid-electrolyte material according to the first embodiment.

Since the battery according to the second embodiment includes the solid-electrolyte material according to the first embodiment, it has suitable charge-discharge characteristics.

A specific example of the battery according to the second embodiment is described below.

Figure 1:
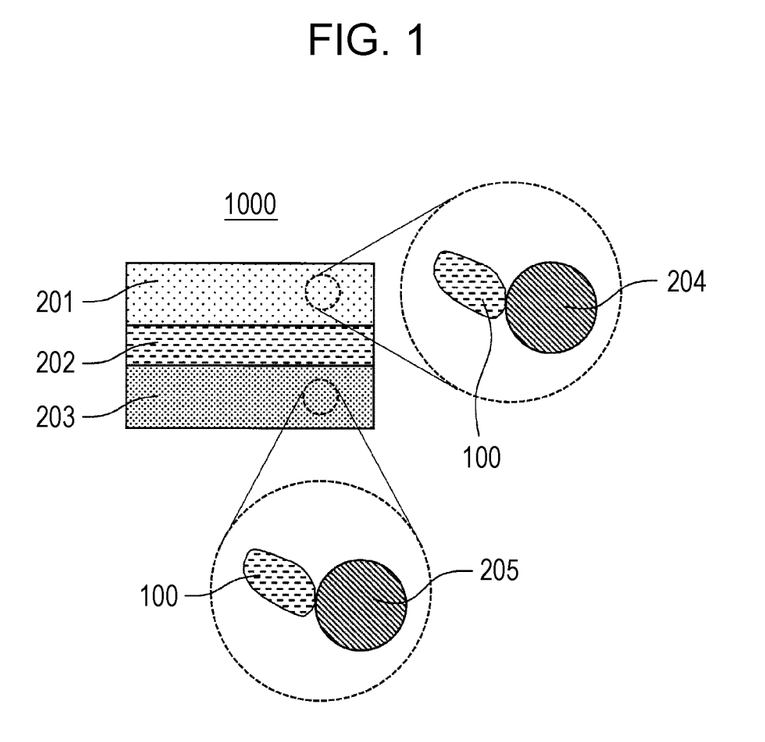
FIG. 1 is a cross-sectional view of a battery according to a second embodiment.

FIG. 1 is a cross-sectional view of a battery 1000 according to the second embodiment.

The battery 1000 includes a positive electrode 201, an electrolyte layer 202, and a negative electrode 203.

The positive electrode 201 includes a positive electrode active material particle 204 and a solid electrolyte particle 100.

The electrolyte layer 202 is interposed between the positive electrode 201 and the negative electrode 203.

The electrolyte layer 202 includes an electrolyte material (e.g., a solid-electrolyte material).

The negative electrode 203 includes a negative electrode active material particle 205 and a solid electrolyte particle 100.

The solid electrolyte particle 100 is a particle including the solid-electrolyte material according to the first embodiment as a principal component. The expression "particle including the solid-electrolyte material according to the first embodiment as a principal component" refers to a particle the most abundant component of which is the solid-electrolyte material according to the first embodiment. The solid electrolyte particle 100 may be a particle composed of the solid-electrolyte material according to the first embodiment.

The positive electrode 201 includes a material capable of occluding and releasing a metal ion (e.g., a lithium ion). Examples of such a material include a positive electrode active material (e.g., the positive electrode active material particles 204).

Examples of the positive electrode active material include a lithium transition metal oxide, a transition metal fluoride, a polyanion material, a polyanion fluoride material, a transition metal sulfide, a transition metal oxyfluoride, a transition metal oxysulfide, and a transition metal oxynitride. Examples of the lithium transition metal oxide include $Li(NiCoAl)O_2$, $LiCoO_2$, and $Li(NiCoMn)O_2$.

The positive electrode active material particles 204 may have a median diameter of greater than or equal to 0.1 μm and less than or equal to 100 μm. When the positive electrode active material particles 204 have a median diameter of greater than or equal to 0.1 μm, the positive electrode active material particles 204 and the solid electrolyte particles 100 can be dispersed in the positive electrode in a suitable manner. This enhances the charge-discharge characteristics of the battery. When the positive electrode active material particles 204 have a median diameter of less than or equal to 100 μm, the rate at which lithium ions diffuse in the positive electrode active material particles 204 is increased. This enables high-power operation of the battery.

The positive electrode active material particles 204 may have a larger median diameter than the solid electrolyte particles 100. In such a case, the positive electrode active material particles 204 and the solid electrolyte particles 100 can be dispersed in a suitable manner.

In consideration of the energy density and power of the battery, in the positive electrode 201, the ratio of the volume of the positive electrode active material particles 204 to the total volume of the positive electrode active material particles 204 and the solid electrolyte particles 100 may be greater than or equal to 0.30 and less than or equal to 0.95.

In consideration of the energy density and power of the battery, the positive electrode 201 may have a thickness of greater than or equal to 10 μm and less than or equal to 500 μm.

The electrolyte layer 202 includes an electrolyte material. Examples of the electrolyte material include a solid-electrolyte material. The electrolyte layer 202 may be a solid-electrolyte layer. The solid-electrolyte material included in the electrolyte layer 202 may include the solid-electrolyte material according to the first embodiment.

The electrolyte layer 202 may be composed only of the solid-electrolyte material according to the first embodiment.

The electrolyte layer 202 may be composed only of a solid-electrolyte material different from the solid-electrolyte material according to the first embodiment. Examples of the solid-electrolyte material different from the solid-electrolyte material according to the first embodiment include $Li_2MgX'_4$, $Li_2FeX'_4$, $Li(Al,Ga,In)X'_4$, $Li_3(Al,Ga,In)X'_6$, and LiX', where X' is at least one element selected from the group consisting of F, Cl, Br, and I.

Hereinafter, the solid-electrolyte material according to the first embodiment is referred to as "first solid-electrolyte material", and the solid-electrolyte material different from the solid-electrolyte material according to the first embodiment is referred to as "second solid-electrolyte material".

The electrolyte layer 202 may include the second solid-electrolyte material in addition to the first solid-electrolyte material. The first and second solid-electrolyte materials may be dispersed uniformly.

A layer composed of the first solid-electrolyte material and a layer composed of the second solid-electrolyte material may be stacked on top of each other in the direction in which the layers constituting the battery 1000 are stacked.

The electrolyte layer 202 may have a thickness of greater than or equal to 1 μm and less than or equal to 100 μm. When the electrolyte layer 202 has a thickness of greater than or equal to 1 μm, the risk of short circuit between the positive electrode 201 and the negative electrode 203 is reduced. When the electrolyte layer 202 has a thickness of less than or equal to 100 μm, the battery can be operated at a high power.

The negative electrode 203 includes a material capable of occluding and releasing a metal ion (e.g., a lithium ion). Examples of such a material include a negative electrode active material (e.g., the negative electrode active material particles 205).

Examples of the negative electrode active material include a metal material, a carbon material, an oxide, a nitride, a tin compound, and a silicon compound. The metal material may be a simple substance or an alloy. Examples of the metal material include lithium metal or a lithium alloy. Examples of the carbon material include natural graphite, coke, graphitizing carbon, carbon fibers, spherical carbon, artificial graphite, and amorphous carbon. Examples of negative electrode active materials suitable in terms of capacity density include silicon (i.e., Si), tin (i.e., Sn), a silicon compound, and a tin compound. A negative electrode active material having a low average discharge voltage, such as graphite, may be used to increase the energy density of the battery.

The negative electrode 203 may include the first solid-electrolyte material. Since the first solid-electrolyte material has high reduction resistance, it can be used in combination with a negative electrode active material, such as graphite or lithium metal.

The negative electrode active material particles 205 may have a median diameter of greater than or equal to 0.1 μm and less than or equal to 100 μm. When the negative electrode active material particles 205 have a median diameter of greater than or equal to 0.1 μm, the negative electrode active material particles 205 and the solid electrolyte particles 100 can be dispersed in the negative electrode in a suitable manner. This enhances the charge-discharge characteristics of the battery. When the negative electrode active material particles 205 have a median diameter of less than or equal to 100 μm, the rate at which lithium ions diffuse in the negative electrode active material particles 205 is increased. This enables high-power operation of the battery.

In consideration of the energy density and power of the battery, in the negative electrode 203, the ratio of the volume of the negative electrode active material particles 205 to the total volume of the negative electrode active material particles 205 and the solid electrolyte particles 100 may be greater than or equal to 0.30 and less than or equal to 0.95.

In consideration of the energy density and power of the battery, the negative electrode 203 may have a thickness of greater than or equal to 10 µm and less than or equal to 500 µm.

At least one selected from the group consisting of the positive electrode 201, the electrolyte layer 202, and the negative electrode 203 may include the second solid-electrolyte material in order to enhance ionic conductivity, chemical stability, and electrochemical stability. Examples of the second solid-electrolyte material include a sulfide solid electrolyte, an oxide solid electrolyte, a halide solid electrolyte, and an organic polymer solid electrolyte.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$.

Examples of the oxide solid electrolyte include:
(i) NASICON-type solid electrolytes, such as $LiTi_2(PO_4)_3$ and element substitution products thereof;
(ii) perovskite-type solid electrolytes, such as $(LaLi)TiO_3$;
(iii) LIS ICON-type solid electrolytes, such as $Li_{14}ZnGe_4O_{16}$, $Li_4SiO_4$, $LiGeO_4$, and element substitution products thereof;
(iv) garnet-type solid electrolytes, such as $Li_7La_3Zr_2O_{12}$ and element substitution products thereof; and
(v) $Li_3PO_4$ and N-substitution products thereof.

Examples of the halide solid electrolyte include, as described above, $Li_2MgX'_4$, $Li_2FeX'_4$, $Li(Al,Ga,In)X'_4$, $Li_3(Al,Ga,In)X'_6$, and $LiX'$.

Examples of the halide solid electrolyte further include a compound represented by $Li_pMe_qY_rZ_6$, where $p+m'q+3r=6$ and $r>0$ are satisfied. Me is at least one element selected from the group consisting of metal and metalloid elements other than Li or Y, and m' represents the valence of Me. Z is at least one element selected from the group consisting of F, Cl, Br, and I. The term "metalloid elements" used herein refers to B, Si, Ge, As, Sb, and Te. The term "metal elements" used herein refers to all the elements (except hydrogen) of Groups 1 to 12 in the periodic table and all the elements (except B, Si, Ge, As, Sb, Te, C, N, P, O, S, and Se) of Groups 13 to 16 in the periodic table. Me may be at least one element selected from the group consisting of Mg, Ca, Sr, Ba, Zn, Sc, Al, Ga, Bi, Zr, Hf, Ti, Sn, Ta, and Nb in consideration of the ionic conductivity of the halide solid electrolyte.

Examples of the organic polymer solid electrolyte include a high-molecular-weight compound and a compound of a lithium salt. The high-molecular-weight compound may have an ethylene oxide structure. Since a high-molecular-weight compound having an ethylene oxide structure is capable of containing a large amount of lithium salt, ionic conductivity can be increased. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. Only one type of lithium salt selected from the above lithium salts may be used alone. Two or more types of lithium salts selected from the above lithium salts may be used in a mixture.

At least one selected from the group consisting of the positive electrode 201, the electrolyte layer 202, and the negative electrode 203 may include a nonaqueous electrolyte solution, a gel electrolyte, or an ionic liquid in order to facilitate the transfer of lithium ions and enhance the output characteristics of the battery.

The nonaqueous electrolyte solution includes a nonaqueous solvent and a lithium salt dissolved in the nonaqueous solvent.

Examples of the nonaqueous solvent include a cyclic carbonate ester solvent, a chain carbonate ester solvent, a cyclic ether solvent, a chain ether solvent, a cyclic ester solvent, a chain ester solvent, and a fluorine solvent. Examples of the cyclic carbonate ester solvent include ethylene carbonate, propylene carbonate, and butylene carbonate. Examples of the chain carbonate ester solvent include dimethyl carbonate, ethylmethyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the chain ester solvent include methyl acetate. Examples of the fluorine solvent include fluoroethylene carbonate, methyl fluoropropionate, fluorobenzene, fluoroethyl methyl carbonate, and fluorodimethylene carbonate. Only one type of nonaqueous solvent selected from the above nonaqueous solvents may be used alone. Two or more types of nonaqueous solvents selected from the above nonaqueous solvents may be used in a mixture. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. Only one type of lithium salt selected from the above lithium salts may be used alone. Two or more types of lithium salts selected from the above lithium salts may be used in a mixture.

The concentration of the lithium salt may be, for example, greater than or equal to 0.5 mol/liter and less than or equal to 2 mol/liter.

The gel electrolyte may be a polymer material impregnated with a nonaqueous electrolyte solution. Examples of the polymer material include polyethylene oxide, polyacrylonitrile, polyvinylidene fluoride, polymethyl methacrylate, and a polymer including an ethylene oxide bond.

Examples of the cation included in the ionic liquid include:
(i) aliphatic chain quaternary salts, such as tetraalkylammonium and tetraalkylphosphonium;
(ii) aliphatic cyclic ammoniums, such as a pyrrolidinium, a morpholinium, an imidazolinium, a tetrahydropyrimidinium, a piperazinium, and a piperidinium; and
(iii) nitrogen-containing heterocyclic aromatic cations, such as a pyridinium and an imidazolium.

Examples of the anion included in the ionic liquid include $PF_6^-$, $BE_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$.

The ionic liquid may include a lithium salt.

At least one selected from the group consisting of the positive electrode 201, the electrolyte layer 202, and the negative electrode 203 may include a binding agent in order to increase the adhesion between the particles.

Examples of the binding agent include polyvinylidene fluoride, polytetrafluoroethylene, polyethylene, polypropylene, an aramid resin, polyamide, polyimide, polyamide imide, polyacrylonitrile, polyacrylic acid, polymethyl acrylate ester, polyethyl acrylate ester, polyhexyl acrylate ester, polymethacrylic acid, polymethyl methacrylate ester, polyethyl methacrylate ester, polyhexyl methacrylate ester, polyvinyl acetate, polyvinylpyrrolidone, polyether, polyethersulfone, hexafluoropolypropylene, a styrene-butadiene rubber, and carboxymethyl cellulose. A copolymer may also be used as a binding agent.

Examples of such a binding agent include copolymers of two or more materials selected from the group consisting of tetrafluoroethylene, hexafluoroethylene, hexafluoropropylene, perfluoroalkyl vinyl ether, vinylidene fluoride, chlorotrifluoroethylene, acrylic acid, and hexadiene. Alternatively, a mixture of two or more materials selected from the above materials may be used as a binding agent.

At least one selected from the group consisting of the positive electrode 201 and the negative electrode 203 may include a conductant agent in order to increase electron conductivity.

Examples of the conductant agent include:
(i) graphite materials, such as natural graphite and artificial graphite;
(ii) carbon black materials, such as acetylene black and Ketjenblack;
(iii) conductive fibers, such as a carbon fiber and a metal fiber;
(iv) carbon fluorides;
(v) metal powders, such as aluminum;
(vi) conductive whiskers, such as zinc oxide and potassium titanate;
(vii) conductive metal oxides, such as titanium oxide; and
(viii) conductive high-molecular-weight compounds, such as polyaniline, polypyrrole, and polythiophene.

The conductant agents (i) and (ii) may be used to reduce the costs.

Examples of the shape of the battery according to the second embodiment include coin-like, cylindrical, rectangular, sheet-like, button-like, flat, and multilayer.

EXAMPLES

The present disclosure is described in further detail with reference to Examples below.

Example 1

Preparation of Solid-Electrolyte Material

LiBr and $CaI_2$ were prepared as raw material powders at a LiBr:$CaI_2$ molar ratio of 2:1 in an argon atmosphere having a dew point of less than or equal to −60° C. (hereinafter, referred to as "dry argon atmosphere"). These raw material powders were pulverized and mixed with each other in a mortar. Hereby, a mixed powder was prepared. The mixed powder was subsequently baked at 600° C. for 30 minutes with a baking furnace in an argon atmosphere having a dew point of less than or equal to −60° C. and an oxygen concentration of 20 ppm. A powder of a solid-electrolyte material of Example 1 was prepared in the above-described manner. The solid-electrolyte material prepared in Example 1 had the composition represented by $Li_2CaBr_2I_2$.

Analysis of Crystal Structure

Figure 2:
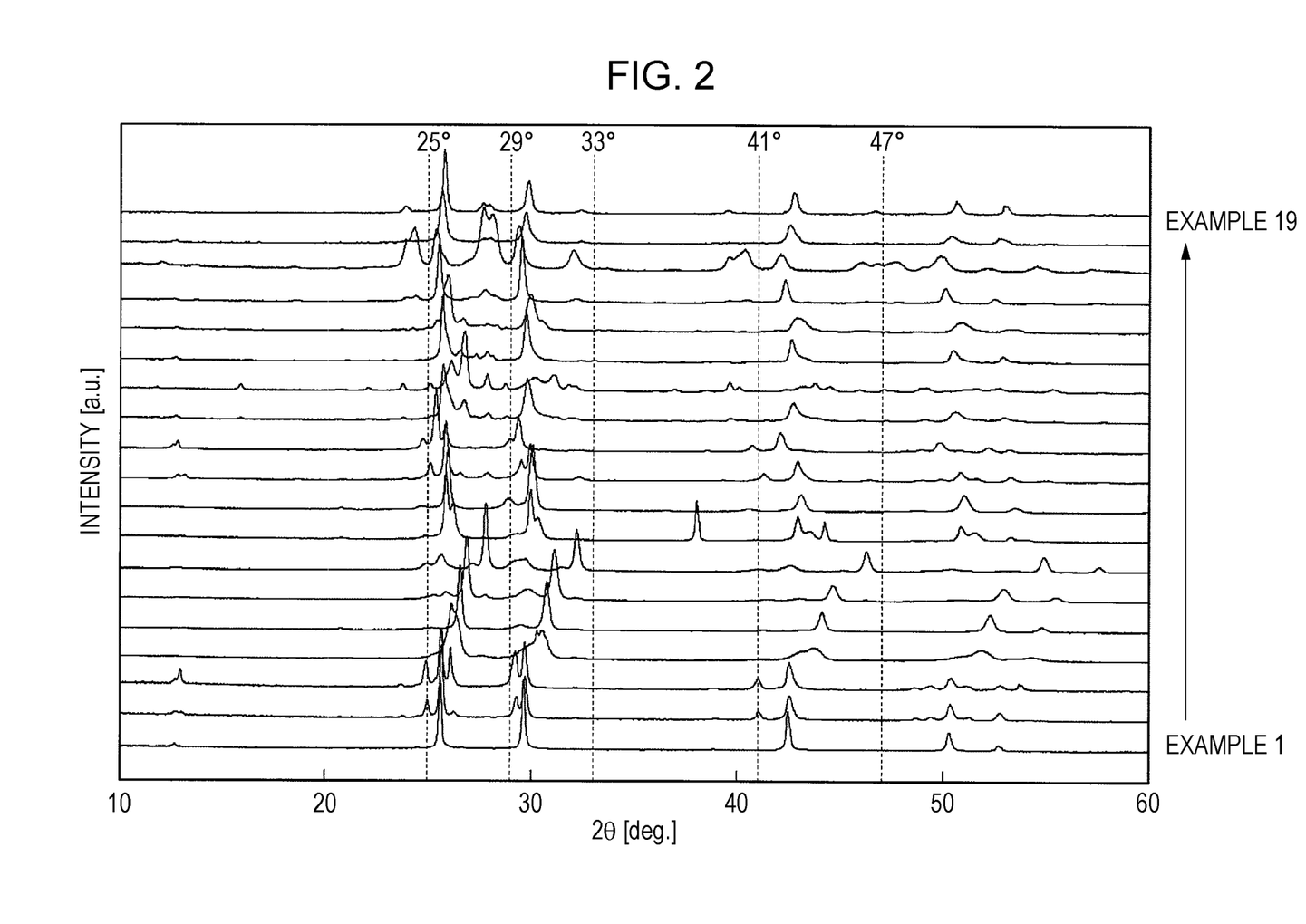
FIG. 2 includes graphs illustrating the X-ray diffraction patterns of solid-electrolyte materials prepared in Examples 1 to 19 which were obtained by an X-ray diffraction measurement using Cu-Kα radiation.

FIG. 2 includes graphs illustrating the X-ray diffraction patterns of solid-electrolyte materials. The results illustrated in FIG. 2 were measured by the following method.

The X-ray diffraction pattern of the solid-electrolyte material prepared in Example 1 was measured with an X-ray diffractometer (Rigaku Corporation, MiniFlex 600) in a dry atmosphere having a dew point of less than or equal to −45° C. The X-ray source used was Cu-Kα radiation.

In the X-ray diffraction pattern of the solid-electrolyte material prepared in Example 1, a peak was present at diffraction angles 2θ of 12.70°, 25.60°, 29.64°, and 42.48°.

The above peak angles substantially coincided with some of the peak angles observed in an X-ray diffraction pattern of an inverse-spinel structure having a lattice constant a of 12.01 Å.

Figure 3:
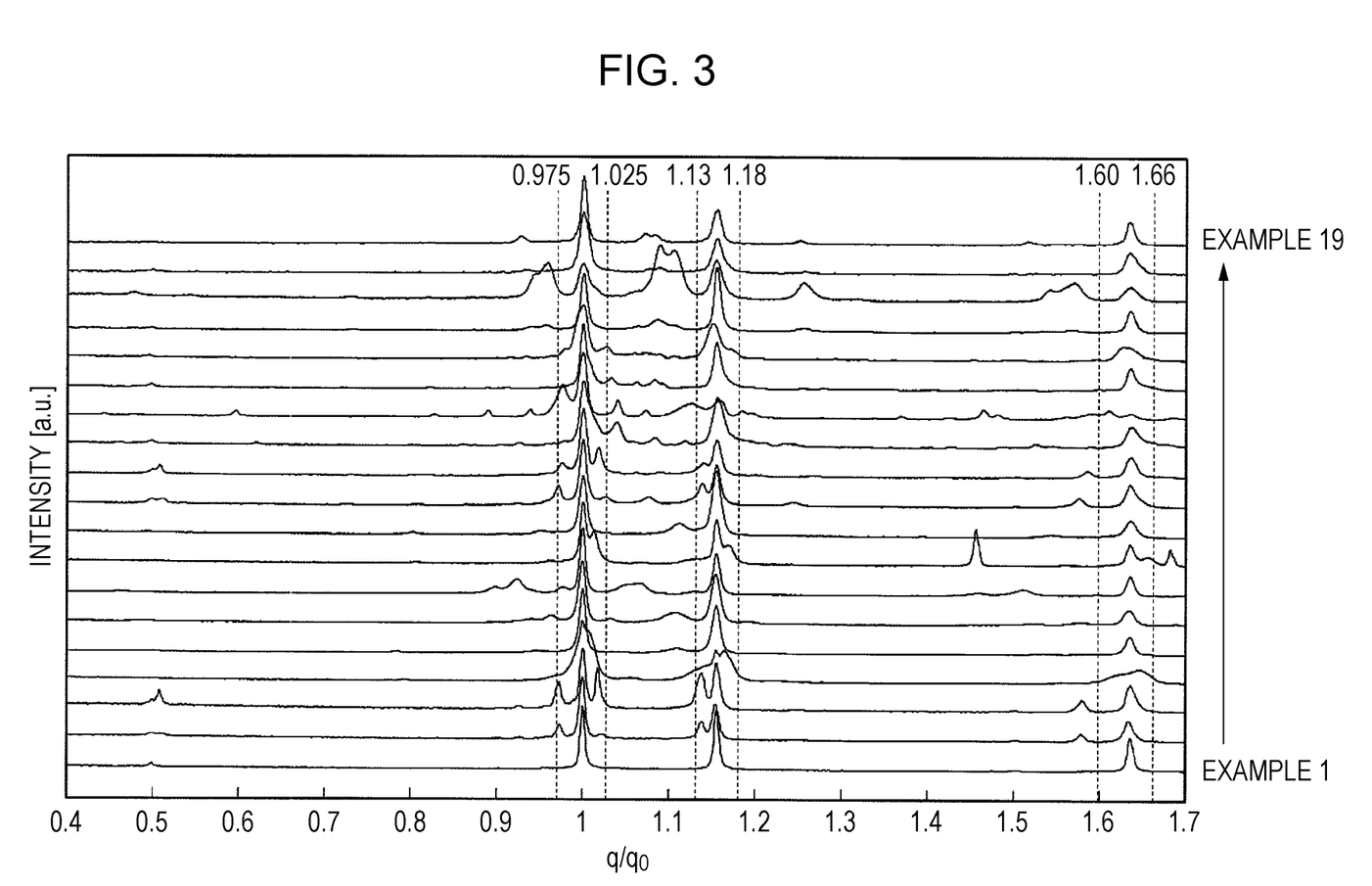
FIG. 3 includes graphs obtained by transforming the horizontal axis of the respective graphs included in FIG. 2 from $2\theta$ to $q/q_0$.

FIG. 3 includes graphs obtained by transforming the horizontal axis of the respective X-ray diffraction patterns included in FIG. 2 from 2θ to $q/q_0$. In other words, FIG. 3 includes graphs illustrating second conversion patterns. In the X-ray diffraction pattern of the solid-electrolyte material prepared in Example 1, the peak observed at a diffraction angle 2θ of 25.60° is the peak corresponding to $q_0$. In the second conversion pattern of the solid-electrolyte material prepared in Example 1, a peak was present at $q/q_0$ values of 0.499, 1.155, and 1.635.

Elemental Analysis

The oxygen content in the solid-electrolyte material prepared in Example 1 was measured with an oxygen, nitrogen, and hydrogen analyzer (HORIBA, Ltd., EMGA-930) by a non-dispersive infrared absorption method. The solid-electrolyte material (12.7 mg) prepared in Example 1 was charged into a nickel capsule attached thereto. The capsule and Sn (500 mg) were then charged into a sample holder. Subsequently, the oxygen content was measured. The oxygen content was 0.530% by weight of the total amount of the solid-electrolyte material. The molar ratio of oxygen to Ca which was calculated from the above oxygen content was 0.156.

Measurement of Ionic Conductivity

Figure 4:
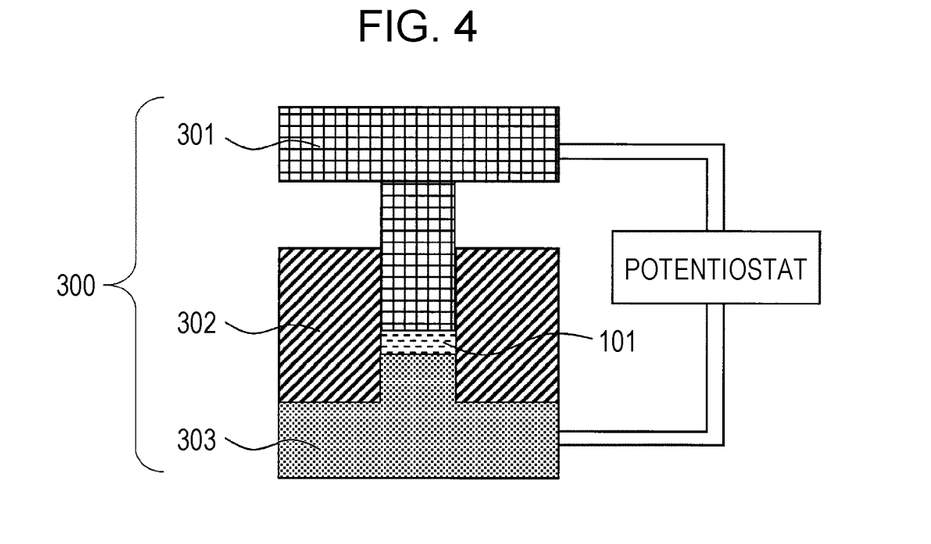
FIG. 4 is a schematic diagram illustrating a pressure molding die used for evaluating the ionic conductivity of a solid-electrolyte material.

FIG. 4 is a schematic diagram illustrating a pressure molding die 300 used for evaluating the ionic conductivity of the solid-electrolyte material.

The pressure molding die 300 included a punch upper portion 301, a die 302, and a punch lower portion 303. The die 302 was composed of insulated polycarbonate. The punch upper and lower portions 301 and 303 were composed of electronically conductive stainless steel.

The ionic conductivity of the solid-electrolyte material prepared in Example 1 was measured using the pressure molding die 300 illustrated in FIG. 4 by the following method.

In an argon atmosphere having a dew point of less than or equal to −80° C., a powder of the solid-electrolyte material prepared in Example 1 (i.e., the solid-electrolyte material powder 101 in FIG. 4) was charged into the pressure molding die 300. Inside the pressure molding die 300, a pressure of 360 MPa was applied to the powder of the solid-electrolyte material prepared in Example 1 using the punch upper portion 301 and the punch lower portion 303.

While the pressure was applied to the powder, the punch upper and lower portions 301 and 303 were connected to a potentiostat (Biologic, VSP-300) equipped with a frequency response analyzer. The punch upper portion 301 was connected to the working electrode and a potential-measuring terminal. The punch lower portion 303 was connected to the counter electrode and the reference electrode. The ionic conductivity of the solid-electrolyte material was measured at room temperature by an electrochemical impedance measurement method.

Figure 5:
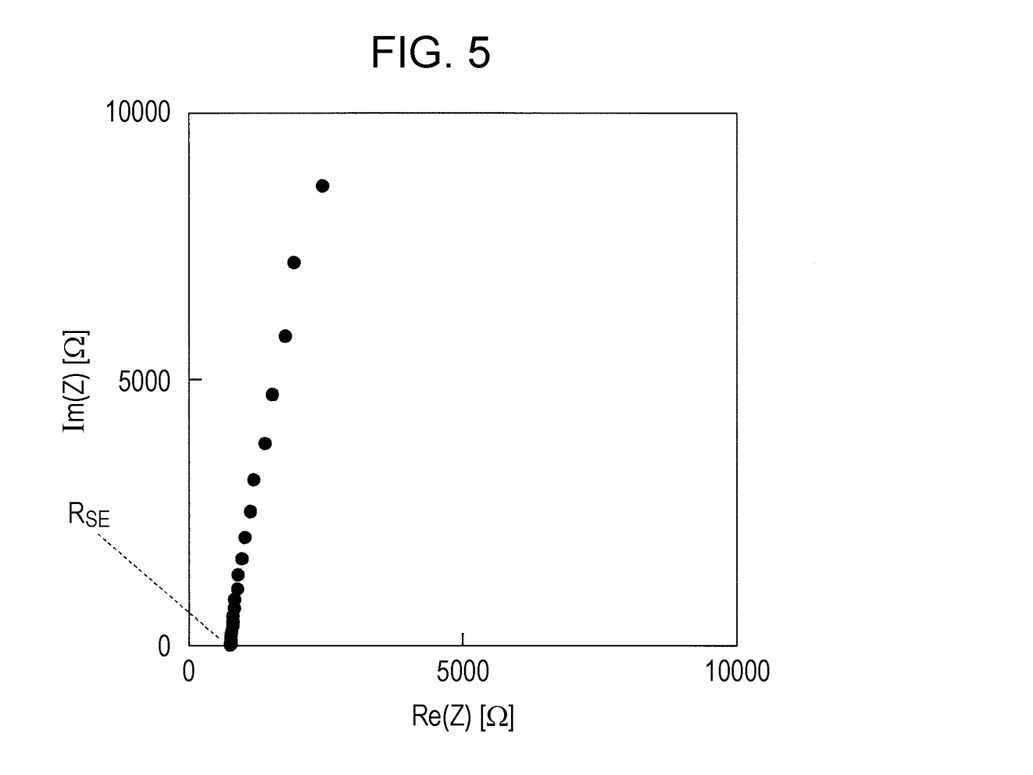
FIG. 5 is a graph illustrating the Cole-Cole plot of the results of measurement of the impedance of a solid-electrolyte material prepared in Example 1.

FIG. 5 is a graph illustrating the Cole-Cole plot of the results of measurement of the impedance of the solid-electrolyte material prepared in Example 1.

In FIG. 5, the real part of the impedance at the measurement point at which the absolute value of phase of complex impedance was minimum was considered the resistance of the solid-electrolyte material to ionic conduction. For the above real part, refer to the arrow $R_{SE}$ illustrated in FIG. 5.

Ionic conductivity was calculated from the above resistance using Expression (1) below.

$$\sigma = (R_{SE} \times S/t)^{-1} \qquad (1)$$

where σ represents ionic conductivity, S represents the area of a part of the solid-electrolyte material which comes into contact with the punch upper portion 301 (equal to the cross-sectional area of the hollowed part of the die 302 in FIG. 4), $R_{SE}$ represents the resistance of the solid-electrolyte material measured in the above impedance measurement, and t represents the thickness of the solid-electrolyte material to which the pressure has been applied (equal to the thickness of the layer formed of the solid-electrolyte material powder 101 in FIG. 4). The ionic conductivity of the solid-electrolyte material prepared in Example 1 which was measured at 25° C. was $5.9 \times 10^{-5}$ S/cm.

Preparation of Secondary Battery

In the dry argon atmosphere, the solid-electrolyte material prepared in Example 1 and graphite, which served as a negative electrode active material, were prepared at a volume ratio of 50:50. The above materials were mixed with each other in an agate mortar to form a negative electrode mixture.

In an insulated cylinder having an inside diameter of 9.5 mm, a sulfide solid electrolyte $75Li_2S$—$P_2S_5$ (80 mg) and the above negative electrode mixture (3.37 mg, including 2 mg of the negative electrode active material) were stacked on top of each other to form a multilayer body. A pressure of 360 MPa was applied to the multilayer body. Hereby, a solid-electrolyte layer and a negative electrode were formed.

Subsequently, a metal In foil (thickness: 200 μm), a metal Li foil (thickness: 200 μm), and a metal In foil (thickness: 200 μm) were stacked on and above the solid-electrolyte layer to prepare a multilayer body. Then, a pressure of 80 MPa was applied to the multilayer body. Hereby, a positive electrode was formed.

A current collector formed of stainless steel was attached to the positive and negative electrodes. Current collection leads were attached to the respective current collectors.

Finally, the inside of the insulated cylinder was isolated from the outside atmosphere using an insulated ferrule. Thus, the inside of the cylinder was hermetically sealed.

A battery of Example 1 was prepared in the above-described manner.

Figure 6:
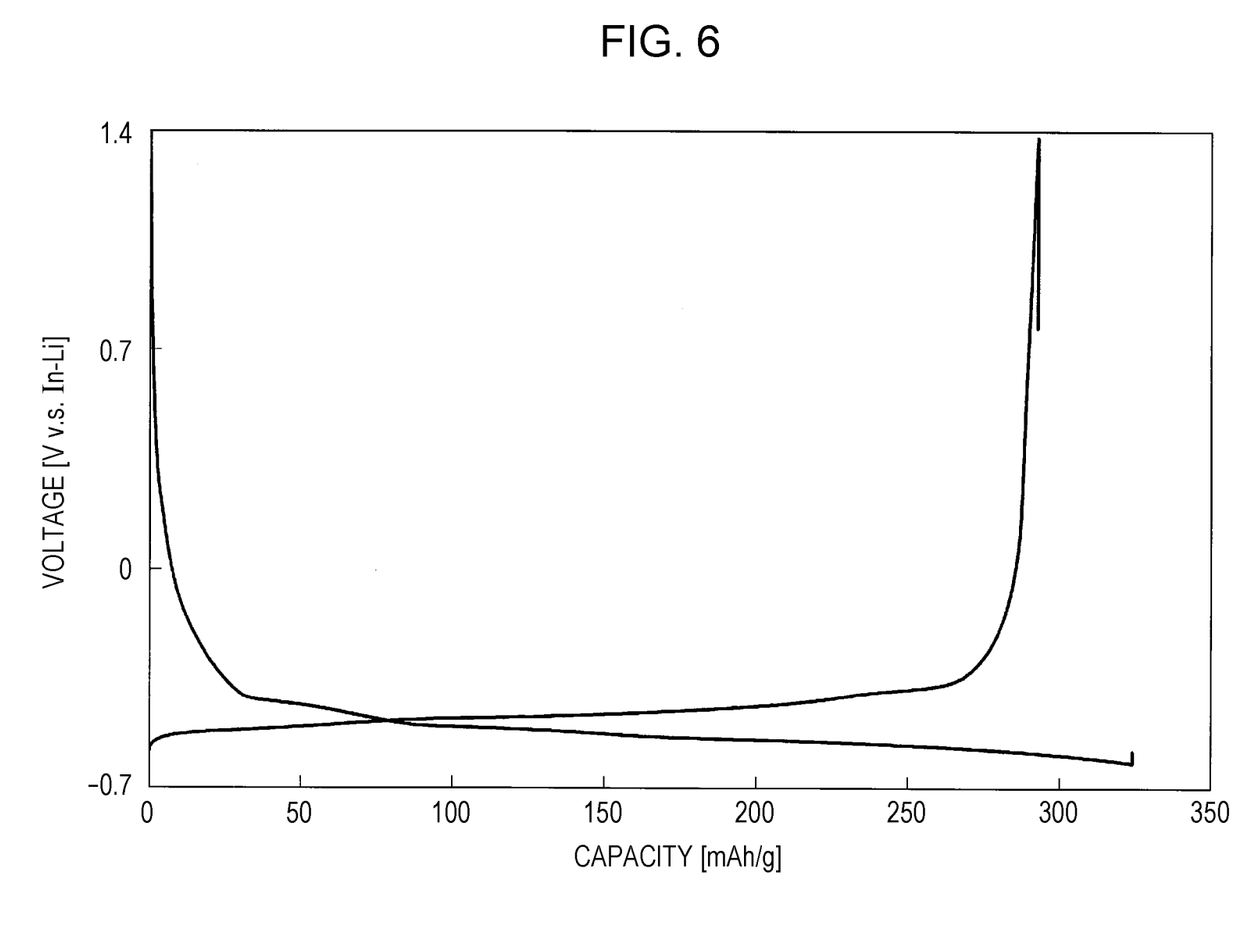
FIG. 6 includes graphs illustrating the initial discharge characteristics of a battery prepared in Example 1.

FIG. 6 includes graphs illustrating the initial charge-discharge characteristics of the battery prepared in Example 1. The results illustrated in FIG. 6 were measured by the following method.

The battery prepared in Example 1 was charged to a voltage of −0.62 V at a current density of 26.1 μA/cm². This current density corresponds to 0.025 C rate. The term "charge" used herein refers to a state in which lithium ions flow in the direction from the In—Li alloy positive electrode to the negative electrode including graphite. Subsequently, the battery prepared in Example 1 was discharged to a voltage of 1.9 V at a current density of 26.1 μA/cm². This current density corresponds to 0.025 C rate. The term "discharge" used herein refers to a state in which lithium ions flow in the direction from the negative electrode including graphite to the In—Li positive electrode.

The results of the above charge-discharge test confirmed that the battery prepared in Example 1 had an initial charge-discharge efficiency of 90.3%.

Examples 2 to 19

Preparation of Solid-Electrolyte Material

In Example 2, LiBr, $CaBr_2$, and $CaI_2$ were prepared as raw material powders at a $LiBr:CaBr_2:CaI_2$ molar ratio of 1.34: 0.33:1.

In Example 3, LiBr, $CaBr_2$, and $CaI_2$ were prepared as raw material powders at a $LiBr:CaBr_2:CaI_2$ molar ratio of 1:0.5:1.

In Example 4, LiBr, LiI, and $CaI_2$ were prepared as raw material powders at a $LiBr:LiI:CaI_2$ molar ratio of 2:1:0.5.

In Example 5, LiBr, LiI, and $CaI_2$ were prepared as raw material powders at a $LiBr:LiI:CaI_2$ molar ratio of 2:1.4:0.3.

In Example 6, LiBr, LiI, and $CaI_2$ were prepared as raw material powders at a $LiBr:LiI:CaI_2$ molar ratio of 2.5:0.5:0.5.

In Example 7, LiBr and $CaI_2$ were prepared as raw material powders at a $LiBr:CaI_2$ molar ratio of 3:0.5.

In Example 8, LiBr, LiI, and $CaI_2$ were prepared as raw material powders at a $LiBr:LiI:CaI_2$ molar ratio of 1.5:1.5:0.5.

In Example 9, LiBr, LiI, and $CaI_2$ were prepared as raw material powders at a $LiBr:LiI:CaI_2$ molar ratio of 1:2:0.5.

In Example 10, LiBr, $CaBr_2$, and $CaI_2$ were prepared as raw material powders at a $LiBr:CaBr_2:CaI_2$ molar ratio of 1.34:0.58:0.75.

In Example 11, $CaBr_2$, LiI, and $CaI_2$ were prepared as raw material powders at a $CaBr_2:LiI:CaI_2$ molar ratio of 0.75:1.34:0.58.

In Example 12, LiBr, KI, and $CaI_2$ were prepared as raw material powders at a $LiBr:KI:CaI_2$ molar ratio of 2:0.2:0.9.

In Example 13, LiBr, KI, and $CaI_2$ were prepared as raw material powders at a $LiBr:KI:CaI_2$ molar ratio of 2:0.4:0.8.

In Example 14, LiBr, RbI, and $CaI_2$ were prepared as raw material powders at a $LiBr:RbI:CaI_2$ molar ratio of 2:0.1:0.95.

In Example 15, LiBr, RbI, and $CaI_2$ were prepared as raw material powders at a $LiBr:RbI:CaI_2$ molar ratio of 2:0.2:0.9.

In Example 16, LiBr, NaI, and $CaI_2$ were prepared as raw material powders at a $LiBr:NaI:CaI_2$ molar ratio of 2:0.4:0.8.

In Example 17, LiBr, NaI, and $CaI_2$ were prepared as raw material powders at a $LiBr:NaI:CaI_2$ molar ratio of 2:0.8:0.6.

In Example 18, LiBr, NaI, LiI, and $CaI_2$ were prepared as raw material powders at a $LiBr:NaI:LiI:CaI_2$ molar ratio of 2:0.2:0.2:0.8.

In Example 19, LiBr, NaI, LiI, and $CaI_2$ were prepared as raw material powders at a $LiBr:NaI:LiI:CaI_2$ molar ratio of 2:0.4:0.4:0.6.

The solid-electrolyte materials of Examples 2 to 19 were prepared as in Example 1, except for the above-described items.

Analysis of Crystal Structure

The X-ray diffraction pattern of each of the solid-electrolyte materials prepared in Examples 2 to 19 was measured as in Example 1.

FIG. 2 illustrates the X-ray diffraction patterns of the solid-electrolyte materials prepared in Examples 2 to 19. In all of Examples 2 to 19, a peak was present at a diffraction angle 2θ of greater than or equal to 25° and less than or equal to 29°, a diffraction angle 2θ of greater than or equal to 29° and less than or equal to 33°, and a diffraction angle 2θ of greater than or equal to 41° and less than or equal to 47°. The above peak angles substantially coincided with the peak angles observed in an X-ray diffraction pattern of a rock-salt structure.

In the X-ray diffraction patterns obtained in Examples 2, 3, 10, and 11, another peak was present at a diffraction angle 2θ of greater than or equal to 12° and less than or equal to 14°. The above peak angles substantially coincided with the peak angles observed in an X-ray diffraction pattern of an inverse-spinel structure. Accordingly, it is considered that the solid-electrolyte materials prepared in Examples 1 to 3, 10, and 11 include a crystal phase having an inverse-spinel structure.

The horizontal axis of the X-ray diffraction patterns illustrated in FIG. 2 was transformed as in Example 1. The peaks present at a diffraction angle 2θ of greater than or equal to 25° and less than or equal to 29° are the peaks corresponding to $q_0$. FIG. 3 illustrates the second conversion patterns of the solid-electrolyte materials prepared in Examples 2 to 19. In all of Examples 2 to 19, a peak was present at $q/q_0$ of greater than or equal to 1.13 and less than or equal to 1.18 and a $q/q_0$ of greater than or equal to 1.60 and less than or equal to 1.66.

In the second conversion patterns obtained in Examples 2, 3, 10, and 11, another peak was present at $q/q_0$ of greater than or equal to 0.45 and less than or equal to 0.55.

Elemental Analysis

The solid-electrolyte materials prepared in Examples 2 to 19 were subjected to an elemental analysis as in Example 1. Table 1 lists the measurement results.

Evaluation of Ionic Conductivity

The ionic conductivity of each of the solid-electrolyte materials prepared in Examples 2 to 19 was measured as in Example 1. Table 1 lists the measurement results.

Table 1 lists the composition and evaluation results of each of the solid-electrolyte materials prepared in Examples 1 to 19.

considered that the solid-electrolyte materials prepared in Examples 1 to 19 include a crystal phase having a rock-salt structure or a crystal structure analogous to a rock-salt structure.

Since the solid-electrolyte materials prepared in Examples 1 to 19 do not contain sulfur, they do not produce hydrogen sulfide.

The solid-electrolyte materials prepared in Examples 1 to 19 do not contain any rare-earth elements.

When the solid-electrolyte material prepared in Example 1 was used for producing a battery that included graphite as an active material, the battery had suitable charge-discharge characteristics in terms of Li potential. This confirms that the solid-electrolyte material prepared in Example 1 has high reduction resistance.

As described above, the solid-electrolyte material according to the present disclosure does not contain any of rare-earth elements and sulfur and has a high ionic conductivity and high reduction resistance. The solid-electrolyte material according to the present disclosure is appropriate for producing batteries that can be charged and discharged in a suitable manner.

The solid-electrolyte material according to the present disclosure is used for producing solid-state lithium-ion secondary batteries and the like.

TABLE 1

| | Element ratio | | | | | Ionic conductivity |
| | Li | $M_A$ | Ca | Br | I | O | (S/cm) |
|---|---|---|---|---|---|---|---|
| Example 1 | 2.00 | — | 1.00 | 2.00 | 2.00 | 0.156 | $5.9 \times 10^{-5}$ |
| Example 2 | 1.01 | — | 1.00 | 1.50 | 1.50 | 0.132 | $1.8 \times 10^{-5}$ |
| Example 3 | 0.667 | — | 1.00 | 1.33 | 1.33 | 0.0562 | $4.8 \times 10^{-6}$ |
| Example 4 | 6.00 | — | 1.00 | 4.00 | 4.00 | 0.131 | $6.1 \times 10^{-5}$ |
| Example 5 | 11.3 | — | 1.00 | 6.67 | 6.67 | 0.170 | $1.7 \times 10^{-5}$ |
| Example 6 | 6.00 | — | 1.00 | 5.00 | 3.00 | 0.120 | $1.0 \times 10^{-5}$ |
| Example 7 | 6.00 | — | 1.00 | 6.00 | 2.00 | 0.157 | $1.1 \times 10^{-6}$ |
| Example 8 | 6.00 | — | 1.00 | 3.00 | 5.00 | 0.146 | $4.2 \times 10^{-5}$ |
| Example 9 | 6.00 | — | 1.00 | 2.00 | 6.00 | 0.100 | $7.4 \times 10^{-6}$ |
| Example 10 | 1.01 | — | 1.00 | 1.13 | 1.88 | 0.0473 | $2.9 \times 10^{-6}$ |
| Example 11 | 1.01 | — | 1.00 | 1.88 | 1.13 | 0.0577 | $1.3 \times 10^{-5}$ |
| Example 12 | 2.22 | 0.220 | 1.00 | 2.22 | 2.22 | 0.0844 | $2.7 \times 10^{-5}$ |
| Example 13 | 2.50 | 0.500 | 1.00 | 2.50 | 2.50 | 0.0994 | $5.3 \times 10^{-6}$ |
| Example 14 | 2.11 | 0.110 | 1.00 | 2.11 | 2.11 | 0.148 | $2.6 \times 10^{-5}$ |
| Example 15 | 2.22 | 0.220 | 1.00 | 2.22 | 2.22 | 0.152 | $1.8 \times 10^{-5}$ |
| Example 16 | 2.50 | 0.500 | 1.00 | 2.50 | 2.50 | 0.0425 | $2.9 \times 10^{-5}$ |
| Example 17 | 3.33 | 1.33 | 1.00 | 3.33 | 3.33 | 0.0588 | $1.6 \times 10^{-5}$ |
| Example 18 | 2.75 | 0.250 | 1.00 | 2.50 | 2.50 | 0.0382 | $4.8 \times 10^{-5}$ |
| Example 19 | 4.00 | 0.667 | 1.00 | 3.33 | 3.33 | 0.0416 | $5.0 \times 10^{-5}$ |

Discussions

As is clear from the results listed in Table 1, all of the solid-electrolyte materials prepared in Examples 1 to 19 had a high ionic conductivity of greater than or equal to $1.0 \times 10^{-6}$ S/cm.

The solid-electrolyte materials prepared in Examples 1 to 19 have a peak at a diffraction angle 2θ of greater than or equal to 25° and less than or equal to 29°, a diffraction angle 2θ of greater than or equal to 29° and less than or equal to 33°, and a diffraction angle 2θ of greater than or equal to 41° and less than or equal to 47° in the X-ray diffraction pattern obtained by the X-ray diffraction measurement using Cu-Kα radiation. Furthermore, a peak was present at $q/q_0$ of greater than or equal to 1.13 and less than or equal to 1.18 and a $q/q_0$ of greater than or equal to 1.60 and less than or equal to 1.66 in each of the second conversion patterns. Accordingly, it is

What is claimed is:

1. A solid-electrolyte material comprising:
a crystal phase constituted by Li, M, X, and O,
wherein M is at least one element selected from the group consisting of Mg, Ca, and Sr,
wherein X is at least two elements selected from the group consisting of F, Cl, Br, and I, and
wherein the crystal phase has a peak at a diffraction angle 2θ of greater than or equal to 25° and less than or equal to 29°, a diffraction angle 2θ of greater than 29° and less than or equal to 33°, and a diffraction angle 2θ of greater than or equal to 41° and less than or equal to 47° in an X-ray diffraction pattern obtained by an X-ray diffraction measurement using Cu-Kα radiation.

2. The solid-electrolyte material according to claim 1, wherein M includes Ca.

3. The solid-electrolyte material according to claim 1, wherein X is Br and I.

4. The solid-electrolyte material according to claim 1, wherein the crystal phase further includes MA, and
wherein MA is at least one element selected from the group consisting of Na, K, Rb, and Cs.

5. The solid-electrolyte material according to claim 1, wherein, in a first conversion pattern obtained by transforming a horizontal axis of the X-ray diffraction pattern of the solid-electrolyte material from diffraction angle $2\theta$ to q on the basis of Expression $q=4\pi \sin \theta/\lambda$ (where $\lambda$ represents the wavelength of an X-ray used in the X-ray diffraction measurement), the value of q at which a peak is present at q of greater than or equal to 1.76 $Å^{-1}$ and less than or equal to 2.05 $Å^{-1}$ is defined as $q_0$, and
wherein, in a second conversion pattern obtained by transforming the horizontal axis of the X-ray diffraction pattern from diffraction angle $2\theta$ to $q/q_0$, a peak is present at $q/q_0$ of greater than or equal to 1.13 and less than or equal to 1.18 and $q/q_0$ of greater than or equal to 1.60 and less than or equal to 1.66.

6. The solid-electrolyte material according to claim 1, wherein a molar ratio of Li to M is greater than or equal to 0.667 and less than or equal to 11.3.

7. The solid-electrolyte material according to claim 1, wherein a molar ratio of X to M is greater than or equal to 2.66 and less than or equal to 13.34.

8. The solid-electrolyte material according to claim 1, wherein a molar ratio of O to M is greater than 0 and less than or equal to 0.2.

9. The solid-electrolyte material according to claim 4, wherein a molar ratio of MA to M is greater than or equal to 0 and less than or equal to 1.33.

10. The solid-electrolyte material according to claim 1, wherein a molar ratio of Br to X is greater than or equal to 0.375 and less than or equal to 0.625.

11. The solid-electrolyte material according to claim 1, wherein a molar ratio of I to X is greater than or equal to 0.375 and less than or equal to 0.625.

12. A battery comprising:
a positive electrode;
a negative electrode; and
an electrolyte layer interposed between the positive electrode and the negative electrode,
wherein at least one selected from the group consisting of the positive electrode, the negative electrode, and the electrolyte layer includes the solid-electrolyte material according to claim 1.

13. The battery according to claim 12, wherein the negative electrode includes the solid-electrolyte material.

14. The battery according to claim 13, wherein the negative electrode includes graphite.

* * * * *